United States Patent [19]

Davis et al.

[11] Patent Number: 5,064,481

[45] Date of Patent: Nov. 12, 1991

[54] USE OR ORGANIC ACIDS IN LOW RESIDUE SOLDER PASTES

[75] Inventors: James L. Davis, Tamarac; Robert W. Pennisi, Boca Raton; Fadia Nounou, Plantation; Bobby D. Landreth, Davie, all of Fla.

[73] Assignee: Motorola, Inc., Schaumburg, Ill.

[21] Appl. No.: 524,540

[22] Filed: May 17, 1990

[51] Int. Cl.$^5$ .............................................. B23K 35/34
[52] U.S. Cl. ........................................ 148/23; 148/24; 148/25
[58] Field of Search ..................................... 148/23-25

[56] References Cited

U.S. PATENT DOCUMENTS

| 4,278,479 | 7/1981 | Anderson | 148/23 |
| 4,428,780 | 1/1984 | Shedroff | 148/24 |
| 4,708,751 | 11/1987 | Froebel | 148/23 |
| 4,960,236 | 10/1990 | Hedges et al. | 228/180.1 |
| 4,963,401 | 10/1990 | Kaspaul | 148/25 |

*Primary Examiner*—Peter D. Rosenberg
*Attorney, Agent, or Firm*—Daniel K. Nichols

[57] ABSTRACT

Fluxing compositions are described containing as fluxing agents compounds of the formula:

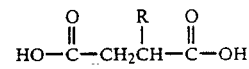

where R is an electron withdrawing group. In one embodiment, R is selected from the group consisting of fluorine, chlorine, bromine, iodine, sulfur, hydroxyl, nitrile, and benzyl. The compound cleans oxides from the printed circuit boards (PCBs) under assembly and then volatilize with little or no need for a cleaning step, or cleaning only with water or formic acid. Very little or no undesired residue remains. Such acid fluxing agents can be used mixed with typical solder formulations, such as lead/tin solder pastes, or applied topically to solders, such as solder balls; both techniques permit the assembly of PCBs more easily with high quality bonds, and with little or no residue. Malic acid is a preferred organic acid fluxing agent.

22 Claims, No Drawings

USE OR ORGANIC ACIDS IN LOW RESIDUE SOLDER PASTES

FIELD OF THE INVENTION

The invention relates to solder flux formulations, and in one aspect, more particularly relates to solder flux formulations incorporating malic acid.

BACKGROUND OF THE INVENTION

Solder formulations, also known as solder creams or solder pastes, are homogeneous blends of a soft solder alloy typically in a powder form dispersed in a liquid medium conventionally containing a fluxing composition or flux, an organic solvent, and a thickening agent which will give the desired viscous or paste-like consistency to the solder formulation. Such solder formulations can be applied to the surfaces or locations requiring soldering in a number of various ways, such as by screen printing, or by means of a dispenser such as a syringe, or simply by dipping the site to be soldered into the solder paste formulation so that the viscous paste adheres to the site, such as an electronic component lead.

Recently, solder paste formulations have been used increasingly by the electronics industry, particularly in the automated manufacture of printed circuits in which leadless miniature electronic components are surface mounted on a printed circuit board (PCB) to which a solder paste formulation has previously been applied, such as by screen printing. The PCB is then subjected to a sufficiently high temperature, for example by means of a heated conveyor belt, to cause the flux and solder alloy in the formulation to liquefy and contact the electronic component leads so that on subsequent cooling of the PCB, the components will remain soldered on the PCB.

For some uses in the electronics industry, it is desirable to use as the flux composition of the solder formulation a material which is non-corrosive and which will provide, after the heating and cooling steps, flux residues which are themselves non-corrosive and non-conducting. For this reason, rosin-based flux compositions are widely used in the commercially available solder paste formulations specifically made for use in the manufacture of surface mounted electronic components.

Alternatively, more reactive fluxing compositions may be used, which leave residues which are corrosive and/or conductive. Often a somewhat corrosive fluxing composition is desired so that the oxides which form on the metal surfaces to be soldered may be removed to permit the subsequently formed solder bond to be stronger both physically and electrically. However, it is necessary to remove these residues formed by means of either aqueous or organic solvent systems to ensure that the resulting soldered circuit is non-corrosive.

The use of solder paste formulations containing such rosin-based or more reactive fluxes has a number of disadvantages. First, because the non-corrosive residues (such as rosins) tend to be sticky, they prevent repetitive automatic testing of the circuit. Rosin-based fluxes tend to leave copious amounts of residue on the circuit. Additionally, such residues are unsightly and therefore, as with the corrosive flux residues which are also unattractive, will need to be removed. The removal step involves extra production equipment, time and material.

Secondly, flux residues tend to be hygroscopic and may thereby cause spattering. Thirdly, some fluxes permit solder particles in the paste to move away from the solder site and give rise to the formation of numbers of discrete small balls of soft solder around the soldered joints, which can create electrical short circuits.

Because of these and other disadvantages, it is desirable and often essential to meet specifications, to remove the flux residues and any solder balls as much as possible. Often, however, their removal is difficult or impossible, particularly from areas of the PCB underneath the electronic components.

As noted, a common procedure is to use an aqueous or organic solvent in the removal of flux residues. Though water is preferred because it will not leave an objectionable residue itself, water typically is an ineffective agent, since many of the residues, such as the rosin residues, are only slightly soluble in water. Organic solvents are more effective, but less desirable because they are more expensive and particularly because they are more troublesome to dispose of. A particular class of organic solvents that had attained widespread use was the halocarbons, such as the chlorofluorocarbons (CFCs), because they would volatilize after cleaning. However, these materials are particularly inert and their eventual decomposition is involved in the undesirable depletion of atmospheric ozone.

Thus, for these and other reasons the prior solder fluxing compositions are less preferred, and it would therefore be advantageous to discover a new fluxing composition that would avoid one or more of these disadvantages.

SUMMARY OF THE INVENTION

Accordingly, it is an object of the present invention to provide a solder fluxing composition that would provide an oxide removing agent during the soldering process.

It is another object of the present invention to provide a novel fluxing agent which is an oxide removing agent that would either readily volatilize or be readily removed with water.

It is yet another object of the invention to provide a fluxing composition that would accomplish the above objectives, but also be easy to formulate.

In carrying out these and other objects of the invention, there is provided, in one form, a solder paste vehicle having a solvent and a fluxing agent, where the fluxing agent has a compound with the formula:

where R is an electron withdrawing group.

DETAILED DESCRIPTION

It has been discovered that compounds of the formula:

where R is an electron withdrawing group, added as the sole or joint fluxing agent to solder pastes is an effective flux for the soldering of solders such as tin/lead, tin/lead/silver and tin/lead/silver/antimony to metals such as copper, aluminum, etc. In one aspect, the R group may be fluorine, chlorine, bromine, iodine, sulfur, nitrile, hydroxyl, benzyl or some other electron withdrawing group. Phrased another way, R must be electronegative, although there is no specific degree of electronegativity required. These excellent fluxing compositions produce substantially less residue than conventional fluxing agents based on rosin chemistry, and in some cases produce no residue at all. In those instances where residue is present, it may be easily and quickly removed with water.

In one aspect of the invention, where R is hydroxyl, the compound is malic acid, $HOOCCH_2CH(OH)COOH$. As will be explained, malic acid was unexpectedly found to perform surprisingly better than other organic acids screened. It has also been discovered that there are a number of ways to implement this concept.

More specifically, malic acid has been found to serve as a good fluxing agent for soldering Sn/Pb and Sn/Pb/Ag compositions to copper over and above other organic acids. It will be appreciated, however, that other solders are expected to be useful in conjunction with malic acid, and that other metals besides copper are expected to be effectively cleaned and bonded to by formulations containing malic acid. The flux can be prepared in a variety of ways, including, but not limited to:

(1) The addition of malic acid powder to a solder paste vehicle.
(2) A solution of malic acid in a number of solvents, including, but not limited to alcohols such as isopropanol and Cellosolve TM derivatives.
(3) Applying malic acid topically in powder form or dissolved in a solvent to solder structures, such as spheres.

With these solder formulations, tests have shown that malic acid is an effective fluxing agent, resulting in solder reflow bonds having minimum or no residue. The addition of malic acid to the paste vehicle is straightforward since the material is a solid powder at room temperature.

The fluxing action of malic acid appears to be derived from the ability of the acid to reduce surface oxides. Interestingly, malic acid can also be used directly as a flux for solder balls or spheres.

The solder used in this process can be untreated solder powder (as in a paste formulation) or solder spheres. The acid may also be applied to formated solder spheres. The metals of the solder may include, but are not limited to, lead, tin, antimony, silver and mixtures thereof. These types of solders were found to exhibit excellent reflow characteristics.

In the instances where malic acid is used in conjunction with a solvent to provide a vehicle for a solder formulation, in one aspect the proportion of malic acid in the vehicle ranges from about 0.1 to about 60 wt. % of the vehicle, and in a preferred aspect from about 0.3 to about 40 wt. % of the vehicle.

It will be appreciated that the proportion of malic acid as a proportion of the solder paste vehicle will vary depending on the particular formulation. For example, high temperature solder pastes or pastes with highly oxidized metal surfaces may require different malic acid proportions or concentrations to those outlined above. The balance of the fluxing composition may be any of the customary materials. It will be appreciated that although the other common materials, such as the rosins, may be used in conjunction with the compounds of the invention, that some of these typical materials contribute to flux residues and should not be employed to take full advantage of the little or no residues provided by the flux compositions of the present invention.

Suitable alcoholic solvents for dissolving the malic acid include, but are not limited to isopropanol; 2-butanol; 1-hexanol; 1-heptanol; 1-octanol; 1-dodecanol; 2-ethoxyethanol; 2-(2-ethoxyethoxy)ethanol; 2-(2-butoxyethoxy)ethanol; n-hexadecanol; n-octadecanol; benzyl alcohol; 1,2-ethanediol; 1,2-propanediol; 1,3-propanediol; 1,2-butanediol; 1,3-butanediol; 1,4-butanediol; 1,2-pentanediol; 1,5-pentanediol; 2,4-pentanediol; 2,5-hexanediol; glycerol; 1,2,4-butanetriol; 2,2'-(ethylenedioxy)diethanol; 1,12-dodecanediol; 1,16-hexadecane-diol and mixtures thereof.

The proposed malic acid fluxing agent can replace current solder fluxing systems based on rosin additives. For example, malic acid can replace the acid in conventional abietic acid-based fluxes. The addition of malic acid to the solder pastes will achieve excellent solder reflow properties and eliminate the residue problems that plague conventional solder pastes. This lack of residue reduces or precludes the need for any board cleaning with ozone-depleting CFCs after solder reflow.

With any of these malic acid fluxes and methods of this invention, no retooling would be required in the existing assembly line. If anything, some cleaning equipment may need to be removed. If some residue does remain with certain of these systems, it will further be appreciated that it may be washed away with water. Depending on the exact organic fragments from the non-metallic compounds, the water to rinse them may need to be treated as well. Nevertheless, these concerns are appreciably less than those presented by the CFC cleaning agents. The invention will be described in more detail with respect to the following illustrative examples.

EXAMPLES 1-15

Various organic acids were added, in quantities ranging from about 10 to about 100 mg., to an aluminum pan containing 10 to 15 30 mil diameter solder spheres. A couple of drops of isopropyl alcohol (IPA) were also added to the pans. The pans were heated on a hot plate to temperatures above the melting point of the tin/lead solder spheres. Whether the solder balls coalesced or fused was observed. Coalescence is a measure of whether reflowing of the solder or wetting of the pan occurred. The following organic acids were evaluated.

TABLE I

Organic Acid Screening

| Example | Acid | Solder ball coalescence occurred? |
|---|---|---|
| 1 | Abietic acid | Yes |
| 2 | Adipic acid | Yes |
| 3 | Ascorbic acid | Yes |
| 4 | Acrylic acid | Yes |
| 5 | Citric acid | Yes |
| 6 | 2-Furoic acid | Yes |
| 7 | Malic acid | Yes |
| 8 | Polyacrylic acid | Yes |
| 9 | Acetic acid | No |
| 10 | Cyclohexane carboxylic acid | No |
| 11 | Formic acid | No |
| 12 | Hexanoic acid | No |
| 13 | 4-Hydroxybutyric acid/Na salt | No |
| 14 | Maleic acid | No |
| 15 | Oxalic acid | No |

EXAMPLE 16

Use of Malic Acid as an Effective Fluxing Agent

Formated solder spheres were prepared by soaking solder balls in formic acid. By "formating" is meant that a format coating is provided over the solder balls which releases formic acid upon soldering in the presence of $CO_2$. Two solutions were made as follows:
Solution A: 1.0560 g of adipic acid in 100 ml of IPA
Solution B: 2.0016 g of malic acid in 100 ml of IPA The separate groups of formatted solder balls were coated with one of the two solutions in an aluminum pan as in Examples 1-15 and the temperature was increased. Both solutions caused reflow and complete coalescence of the solder spheres. No residue was observable with the naked eye in either case.

EXAMPLE 17

Malic Acid Solder Paste Formulation

A solder paste was formulated with the following composition:

| | |
|---|---|
| 0.85544 g | Solder powder: 63% Sn/36.65% Pb/0.35% Sb |
| 0.06190 g | Paraformaldehyde (Aldrich Chemical Co., 95%) |
| 0.04659 g | Malic Acid (Aldrich, 99%) |
| 0.15591 g | Isopropanol (IPA, Fischer Chemical Co. >99.9%) |
| 0.00965 g | 2-Butoxy ethanol (Aldrich, >99%) |

The solder paste was placed in copper plated pans and reflowed.

The solder paste reflowed and the pan was removed from the heat source when the temperature was 220°-250° C. A white-bubbly residue was visible under a microscope at 30X. The residue was removed by physically scraping it from the surface or by dissolving the residue by placing the pan in an ultrasonic water bath for 1 to 3 minutes.

EXAMPLE 18

Malic Acid Solder Paste Formulation

A solder paste was formulated with the following composition:

| | | |
|---|---|---|
| 89.8% | 2.0192 g | Solder powder: 63% Sn/36.65% Pb/0.35% Sb |
| 0.4% | 0.0091 g | Malic Acid (Aldrich Chemical Co., 99%) |
| 0.3% | 0.0024 g | Adipic Acid (Aldrich, >99%) |
| 1.4% | 0.0319 g | Paraformaldehyde (Aldrich, 95%) |
| 4.0% | 0.0902 g | Isopropanol (IPA, Fischer Chemical Co. >99.9%) |
| 4.0% | 0.0900 g | 2-(2-Ethoxyethoxy) ethanol |

The solder paste was placed in copper plated pan and heated until reflow occurred (190°-250° C.). A light brown residue formed after reflow which was not soluble in water as observed in Example 17. Addition of one drop of concentrated formic acid (88%, Fisher Scientific) to the paste mixture in the pan did not result in the degree of wetting that was observed for the initial paste. However, a second drop of formic acid was added to the paste at 250° C. This resulted in volatilization of all visible residue.

EXAMPLE 19

Malic Acid Solder Paste

A very low residue, water cleanable solder paste was formulated with the following composition.

| | |
|---|---|
| 90.0% | Solder powder |
| 1.0% | Malic acid (Aldrich) |
| 7.0% | Solution of 17% Polyacrylic acid in 2-(2-ethoxyethoxy)ethanol |
| 0.3% | Ethylenediamine tetraacetic acid |
| 2.0% | 2,5-Hexanediol (Aldrich 99%) |

This paste was tested in a manner similar to that of Example 17. The reflow characteristics were good and resulted in very minimal residues. All residues that were present were removed by 1 minute rinses with water. Screen printability was also excellent.

EXAMPLE 20

Malic Acid Solder Paste

A very low residue solder paste was formulated with the following composition.

| | |
|---|---|
| 87.0% | Solder powder |
| 1.0% | Paraformaldehyde (Aldrich, 95%) |
| 3.0% | Malic acid (Aldrich, 99%) |
| 9.0% | 1-Dodecanol (Aldrich, 98%) |

This paste was tested in a manner similar to that of Example 17. A residue remained in the pan after reflow of the solder balls. Auger spectroscopy was used to analyze the residue. Carbon, oxygen, chlorine, sulfur, and lead were observed. The residue was removed after dipping the pan in formic acid (88%) for 10 seconds and rinsing. Auger spectroscopy of the pan after cleaning confirmed that all the residue had been removed.

EXAMPLE 21

Malic Acid Solder Paste

This solder paste was formulated with the following composition.

| | |
|---|---|
| 92.0% | Solder powder |
| 2.0% | Malic acid (Aldrich, 99%) |
| 0.3% | EDTA (Ethylene diamine triacetic acid) |
| 6.0% | 2-(2-Ethoxyethoxy)ethanol |

This paste was tested in a manner similar to that of Example 17.

Severe solder balling was observed during reflow of screen printed parts. In addition, solvent bleed-out occurred prior to reflow. However, screen printability of the paste was good.

EXAMPLE 22

Malic Acid Solder Paste

A low residue, formic acid cleanable solder paste was formulated with the following composition.

| | |
|---|---|
| 88.0% | Solder powder |
| 4.0% | Malic acid (Aldrich, 99%) |
| 1.0% | EDTA |
| 1.0% | Polyacrylic acid |
| 5.0% | 1-Dodecanol |
| ~2.0% | 2-(2-Ethoxyethoxy)ethanol—Added because screen printability was poor. |

This paste was tested in a manner similar to that of Example 17. Again, solvent bleed-out occurred prior to reflow. Formic acid eliminated virtually all residue.

EXAMPLE 23

Screen Printability of Malic Acid Solder Paste

The following formulation was prepared:

| | |
|---|---|
| 40.4671 g | Solder Powder |
| 0.8582 g | Malic Acid |
| 1.6176 g | Polyacrylic acid (PAA)/2-(2-ethoxyethoxy)ethanol solution, (18% PAA) |
| 1.1520 g | Saturated malic acid/2-(2-butoxyethoxy)ethanol solution (primarily solvent) |
| 1.0176 g | 2,5-Hexanediol |

Additional solder powder (about 5 g) was added to achieve proper viscosity for screen printing. This result may be achieved by adding less hexanediol, on the order of about 1-1.5%. Although the print definition after screening of this material was poor, appearance after reflow was good.

EXAMPLE 24

Screen Printability of Malic Acid Solder Paste

A solder paste formulation of the following materials was made:

| | |
|---|---|
| 48.5623 g | Sn/Pb Solder Powder |
| 0.9195 g | Malic acid |
| 1.7152 g | 18% PAA in 2-(2-ethoxyethoxy) ethanol |
| 1.1905 g | Saturated malic acid in 2-(2-butoxyethoxy) ethanol |
| 0.4214 g | 2,5-Hexanediol |

The screen printability of the paste was excellent. The screen printing was performed both by hand and using the automatic screen printer. Reflow characteristics were excellent. A small amount of white-to-clear residue remained after reflow, which was readily removed by water rinses.

EXAMPLE 25

Malic Acid in Benzyl Alcohol Solvent

Malic acid was dissolved in benzyl alcohol in the indicated proportions reported in Table II. Three drops of the malic acid/alcohol solution was placed in a copper coated pan with 5 to 10 solder spheres. The pan was placed on a hot plate with a surface temperature ranging from 220° to 260° C. No residue was visible after removal of the pan from the hot plate.

TABLE II

Malic Acid in Benzyl Alcohol Solvent

| Run | Malic Acid wt. (g) | Malic Acid wt. % | Benzyl Alcohol wt. (g) | Benzyl Alcohol wt. % | 5 Solder Balls; Coalescence and wetting of copper surface? |
|---|---|---|---|---|---|
| A | 0.0295 | 0.32 | 6.4644 | 99.7 | yes |
| B | 0.0042 | 0.10 | 10.3674 | 99.9 | no |
| C | 0.0897 | 1.20 | 7.5266 | 98.8 | yes |
| D | 0.0048 | 0.10 | 4.5835 | 99.9 | no |

EXAMPLE 26

Solder Paste using Malic Acid and 1-Dodecanol

Solution 1 was made up as follows:

| | wt. (g) | wt. % |
|---|---|---|
| Malic Acid | 0.0603 | 1.1 |
| Paraformaldehyde | 0.930 | 16.4 |
| 1-Dodecanol | 4.6703 | 82.5 |

A solder paste was then formulated as follows:

| | wt. (g) | wt. % |
|---|---|---|
| Solution 1 | 0.17 | 10.2 |
| Solder powder (Sn/Pb/Ag) | 1.5 | 89.8 |

Solution 1 was prepared by mixing the malic acid in 1-dodecanol at 120°-130° C. Paraformaldehyde was added after the malic acid was in solution. Once Solution 1 was at room temperature it was added to the solder powder and mixed thoroughly. A sample of the paste was placed in a copper plated pan and put on a hot plate at 250° C. The solder powder melted but only partially fused together. No residue was observed in the pan after cooling to room temperature.

EXAMPLE 27

Solder Paste Vehicle using Malic Acid, Benzyl Alcohol and 2,5-Hexanediol

A solder paste vehicle was formulated as follows:

| | wt. (g) | wt. % |
|---|---|---|
| Malic acid | 0.1165 | 3.6 |
| Benzyl alcohol | 2.2094 | 69.0 |
| 2,5-Hexanediol | 0.8784 | 27.4 |

The malic acid was added to the benzyl alcohol and heated to 120°-140° C. until the acid was dissolved. The 2,5-hexanediol was then added to the solution. Two drops of this solution was added to 4 to 8 solder balls in a copper plated pan and placed on a hot plate at 250° C. Within 60 seconds the solder balls melted and fused together wetting the bottom of the copper pan. Upon cooling to room temperature, residue was observed in the pan.

EXAMPLE 28

Solder Paste using Malic Acid, 1-Dodecanol, and 2,5-Hexanediol

Solution 2 was made up as follows:

| | wt. (g) | wt. % |
|---|---|---|
| Malic Acid | 0.1396 | 2.0 |
| Paraformaldehyde | 0.1896 | 2.7 |
| 1-Dodecanol | 5.1471 | 72.3 |
| 2,5-Hexanediol | 1.6413 | 23.0 |

The malic acid was dissolved in 1-dodecanol at 120°-130° C. After the solution became clear the paraformaldehyde was added and the solution was allowed to cool to room temperature. 2,5-Hexanediol was then added to the solution to complete the vehicle. A solder paste was then formulated as follows:

| | | |
|---|---|---|
| Solution 2 | 3.3568 | 6.7 |
| Solder powder (Sn/Pb/Ag) | 46.7990 | 93.3 |

Solution 2 was added to the solder powder and mixed thoroughly. The paste was screen printed onto solder coated pads of a printed wire board with an automated screen printer. The board was passed through an IR reflow oven. The solder paste wetted and fused to the appropriate pads. No visible residue was observed after the boards cooled to room temperature.

It is apparent that the use of the compounds of this invention provide useful fluxing agents in solder paste vehicles. Malic acid is an especially useful organic acid fluxing agent that performs surprisingly better than other acids, particularly in leaving low portions of or no residue. Indeed, it was found that if the proportion of malic acid in the solder paste vehicle is about 5 wt. % or less, no residue is formed with many of the solder paste formulations.

It will be appreciated that modifications may be made in the exact implementation of the invention illustrated in the above examples which would still fall within the spirit and scope of the invention as claimed herein. For example, it is anticipated that the processing conditions, modes or sequences of addition of the vehicles and fluxing compositions, and exact combinations of flux components may be altered to optimize the invention by one skilled in the art. It is also expected that the method of this invention could be used to facilitate assembly of PCBs by having solder paste containing malic acid screened thereon.

We claim:

1. A solder paste vehicle comprising:
   a solvent; and
   a fluxing agent comprising a compound having the formula:

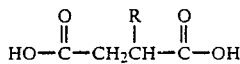

where R is an electron withdrawing group selected from the group consisting of fluorine, chlorine, bromine, iodine, sulfur, hydroxyl, nitrile, and benzyl.

2. The solder paste vehicle of claim 1 where the proportion of the compound in the vehicle ranges from about 0.1 to about 60 wt. % of the vehicle.

3. The solder paste vehicle of claim 1 where the solvent is an alcohol.

4. A solder paste formulation comprising:
   a solder paste vehicle comprising:
      a solvent; and
      a fluxing agent comprising malic acid; and
   a solder powder comprising a metal selected from the group consisting of lead, tin, antimony, silver and mixtures thereof.

5. The solder paste formulation of claim 4 where the proportion of malic acid in the vehicle ranges from about 0.1 to about 60 wt. % of the vehicle.

6. The solder paste formulation of claim 4 where the solvent is an alcohol.

7. A solder paste formulation comprising:
   a solder paste vehicle comprising:
      a alcoholic solvent; and
      a fluxing agent comprising malic acid, where the proportion of malic acid in the vehicle ranges from about 0.1 to about 60 wt. % of the vehicle; and
   a solder powder comprising a metal selected from the group consisting of lead, tin, antimony, silver and mixtures thereof.

8. A method for making a solder paste comprising the steps of:
   making a solder paste vehicle by mixing
      a solvent with
      a fluxing agent comprising a compound having the formula:

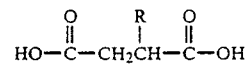

where R is an electron withdrawing group selected from the group consisting of fluorine, chlorine, bromine, iodine, sulfur, hydroxyl, nitrile, and benzyl; and
   mixing the vehicle with a solder powder comprising a metal selected from the group consisting of lead, tin, antimony,
   silver and mixtures thereof.

9. The method of claim 8 where the proportion of the compound in the vehicle ranges from about 0.1 to about 60 wt. % of the vehicle.

10. The method of claim 8 where the solvent is an alcohol.

11. The method of claim 8 where the compound in the fluxing agent is malic acid.

12. A method for using malic acid as a fluxing agent in soldering applications comprising:
    formulating a solder paste by mixing together:
       a solder paste vehicle comprising:
          a solvent; and
          a fluxing agent comprising malic acid; and
       a solder powder comprising a metal selected from the group consisting of lead, tin, antimony, silver and mixtures thereof;
    applying the solder paste to a metallic surface to be soldered; and
    causing the solder formulation to flow and form a solder bond.

13. The method of claim 12 where the proportion of malic acid in the vehicle ranges from about 0.1 to about 60 wt. % of the vehicle.

14. The method of claim 12 where the solvent is an alcohol.

15. The method of claim 12 further comprising the step of removing any residue present with a liquid selected from the group consisting of water and formic acid.

16. A method for using malic acid as a fluxing agent in soldering applications comprising:
    applying solder to a metallic surface to be soldered;
    topically applying malic acid as a fluxing agent to the solder; and
    causing the solder to flow and form a solder bond.

17. The method of claim 16 further comprising the step of removing any residue present with a liquid selected from the group consisting of water and formic acid.

18. A printed circuit board (PCB) bearing solder paste comprising:
    an insulative substrate;
    a plurality of conductive circuit traces on the insulative substrate;
    bonding areas on the insulative substrate, where the bonding areas are in electrical contact with the electrical traces; and
    a solder paste on at least one of the bonding areas, where the solder paste comprises:
       a solder paste vehicle comprising:
          a solvent; and
          a fluxing agent comprising malic acid; and a solder powder comprising a metal selected from the group consisting of lead, tin, antimony, silver and mixtures thereof.

19. The PCB of claim 18 where the proportion of malic acid in the vehicle ranges from about 0.1 to about 60 wt. % of the vehicle.

20. The PCB of claim 18 where the solvent is an alcohol.

21. A printed circuit board (PCB) bearing solder paste comprising:
an insulative substrate;
a plurality of conductive circuit traces on the insulative substrate;
bonding areas on the insulative substrate, where the bonding areas are in electrical contact with the electrical traces; and
a solder paste on at least one of the bonding areas, where the solder paste comprises:
a solder paste vehicle comprising:
an alcohol solvent; and
a fluxing agent comprising malic acid, where the proportion of malic acid in the vehicle ranges from about 0.1 to about 60 wt. % of the vehicle; and
a solder powder comprising a metal selected from the group consisting of lead, tin, antimony, silver and mixtures thereof.

22. A method for using malic acid as a fluxing agent in soldering applications comprising:
formulating a solder paste by mixing together:
a solder paste vehicle comprising:
a solvent; and
a fluxing agent comprising malic acid in a proportion of from about 0.1 to about 5.0 wt. %; and
a solder powder comprising a metal selected from the group consisting of lead, tin, antimony, silver and mixtures thereof;
applying the solder paste to a metallic surface to be soldered; causing the solder formulation to flow and form a solder bond; and
in the absence of a cleaning step.

* * * * *

UNITED STATES PATENT AND TRADEMARK OFFICE
CERTIFICATE OF CORRECTION

PATENT NO. : 5,064,481
DATED : November 12, 1991
INVENTOR(S) : Davis et al.

It is certified that error appears in the above-identified patent and that said Letters Patent is hereby corrected as shown below:

On the title page:

title of the invention, [54], delete "OR" and insert therefor --OF --.

In the title of the invention, column 1, line 1, delete "OR" and insert therefor --OF --.

Signed and Sealed this

Thirteenth Day of July, 1993

Attest:

MICHAEL K. KIRK

Attesting Officer

Acting Commissioner of Patents and Trademarks